(12) United States Patent
Matsui

(10) Patent No.: US 11,511,606 B2
(45) Date of Patent: Nov. 29, 2022

(54) SUNROOF PANEL FOR VEHICLE AND MANUFACTURING METHOD THEREOF

(71) Applicant: AISIN CORPORATION, Kariya (JP)

(72) Inventor: Tatsuya Matsui, Kariya (JP)

(73) Assignee: Aisin Corporation, Aichi (JP)

( * ) Notice: Subject to any disclaimer, the term of this patent is extended or adjusted under 35 U.S.C. 154(b) by 296 days.

(21) Appl. No.: 16/784,771

(22) Filed: Feb. 7, 2020

(65) Prior Publication Data
US 2020/0254856 A1 Aug. 13, 2020

(30) Foreign Application Priority Data
Feb. 8, 2019 (JP) ............................. JP2019-021469

(51) Int. Cl.
*B60J 7/00* (2006.01)
*B60J 7/02* (2006.01)
*B29C 45/14* (2006.01)
*B60J 7/043* (2006.01)
*B29L 31/00* (2006.01)

(52) U.S. Cl.
CPC ......... *B60J 7/022* (2013.01); *B29C 45/14508* (2013.01); *B60J 7/043* (2013.01); *B29L 2031/778* (2013.01)

(58) Field of Classification Search
CPC ....................................................... B60J 7/022
USPC ............................................. 296/216.01, 215
See application file for complete search history.

(56) References Cited

U.S. PATENT DOCUMENTS

| | | | |
|---|---|---|---|
| 2007/0069553 A1* | 3/2007 | Yamada | ................. B60J 10/248 296/216.07 |
| 2019/0299760 A1 | 10/2019 | Fukada et al. | |
| 2019/0366814 A1* | 12/2019 | Renn | ........................ B60J 7/022 |

FOREIGN PATENT DOCUMENTS

| | | | | |
|---|---|---|---|---|
| DE | 10 2017 106 751 B3 | | 5/2018 | |
| EP | 0520523 A1 * | 12/1992 | | .............. B60J 7/022 |
| JP | 4010467 B2 * | 11/2007 | | ....... B29C 45/14377 |
| JP | 2017-132423 | | 8/2017 | |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus for a vehicle includes a first side frame and a second side frame disposed at opposing ends of the sunroof apparatus in a vehicle width direction, a frame unit including a main frame, a first sub frame, and a second sub frame, the frame unit connecting an end portion of the first side frame and an end portion of the second side frame in the vehicle width direction, a fixed panel covering the opening portion of the main frame, and a joint layer covering a rim of the fixed panel and joining the main frame and the fixed panel. The first side frame and the second side frame are connected with the first sub frame and the second sub frame in the vehicle front-rear direction, respectively.

6 Claims, 7 Drawing Sheets

SUNROOF PANEL FOR VEHICLE AND MANUFACTURING METHOD THEREOF

CROSS REFERENCE TO RELATED APPLICATIONS

This application is based on and claims priority under 35 U.S.C. § 119 to Japanese Patent Application 2019-021469, filed on Feb. 8, 2019, the entire content of which is incorporated herein by reference.

TECHNICAL FIELD

This disclosure generally relates to a sunroof panel for a vehicle and a manufacturing method thereof.

BACKGROUND DISCUSSION

A known sunroof device including a sunroof panel, a center panel, and a drive portion is disclosed in JP2017-132423A (hereinafter referred to as Patent reference 1). The sunroof panel is provided at a roof of a vehicle. The center panel opens and closes an opening portion provided at the sunroof panel. The drive portion drives the center panel.

The sunroof panel disclosed in Patent reference 1 is made from a plate-shaped press material made of aluminum alloy. The sunroof panel includes a pair of side frames, a front frame, a middle frame, and a rear frame. The side frames each extends in the vehicle front-rear direction. The front frame connects front end portions of the pair of side frames in the vehicle width direction. The middle frame connects middle portions of the pair of side frames in the vehicle width direction. The rear frame connects rear end portions of the pair of side frames in the vehicle width direction. The sunroof panel includes a front panel and a rear panel. The front panel disclosed in Patent reference 1 covers the front frame. The rear panel covers the opening portion defined by the pair of side frames, the middle frame, and the rear frame. The front panel and the rear panel each corresponds to a fixed panel mounted on plural frames provided at the sunroof panel.

In a case where the front panel, the center panel, and the rear panel of the sunroof panel disclosed in Patent reference 1 are made of glass, rims of the glass panels may be covered with resin to protect the rims of the panels. In this case, the fixed panel is required to be mounted on the plural frames provided at the sunroof panel after the rims of the fixed panel are covered with resin in a manufacturing process of the sunroof panel.

A need thus exists for a sunroof panel for a vehicle and a manufacturing method thereof which is not susceptible to the drawback mentioned above.

SUMMARY

According to an aspect of the disclosure a sunroof apparatus for a vehicle includes a first side frame disposed at one of opposing ends of the sunroof apparatus in a vehicle width direction, the first side frame extending in a vehicle front-rear direction, a second side frame disposed at the other of opposing ends of the sunroof apparatus in the vehicle width direction, the second side frame extending in the vehicle front-rear direction, a frame unit including a main frame including a frame-rim having an edge defining an opening portion extending in the vehicle width direction, a first sub frame extending in the vehicle front-rear direction from a first end portion of the main frame in the vehicle width direction, and a second sub frame extending in the vehicle front-rear direction from a second end portion of the main frame in the vehicle width direction, the frame unit connecting an end portion of the first side frame and an end portion of the second side frame in the vehicle width direction, a fixed panel covering the opening portion of the main frame, and a joint layer covering a panel-rim of the fixed panel and joining the main frame and the fixed panel. The first side frame is connected with the first sub frame in the vehicle front-rear direction. The second side frame is connected with the second sub frame in the vehicle front-rear direction. The joint layer covers the edge of the frame-rim and sandwiches the frame-rim.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A vehicle including a sunroof panel for the vehicle (hereinafter also referred to as a sunroof panel) will hereunder be explained with drawings.

Figure 1:
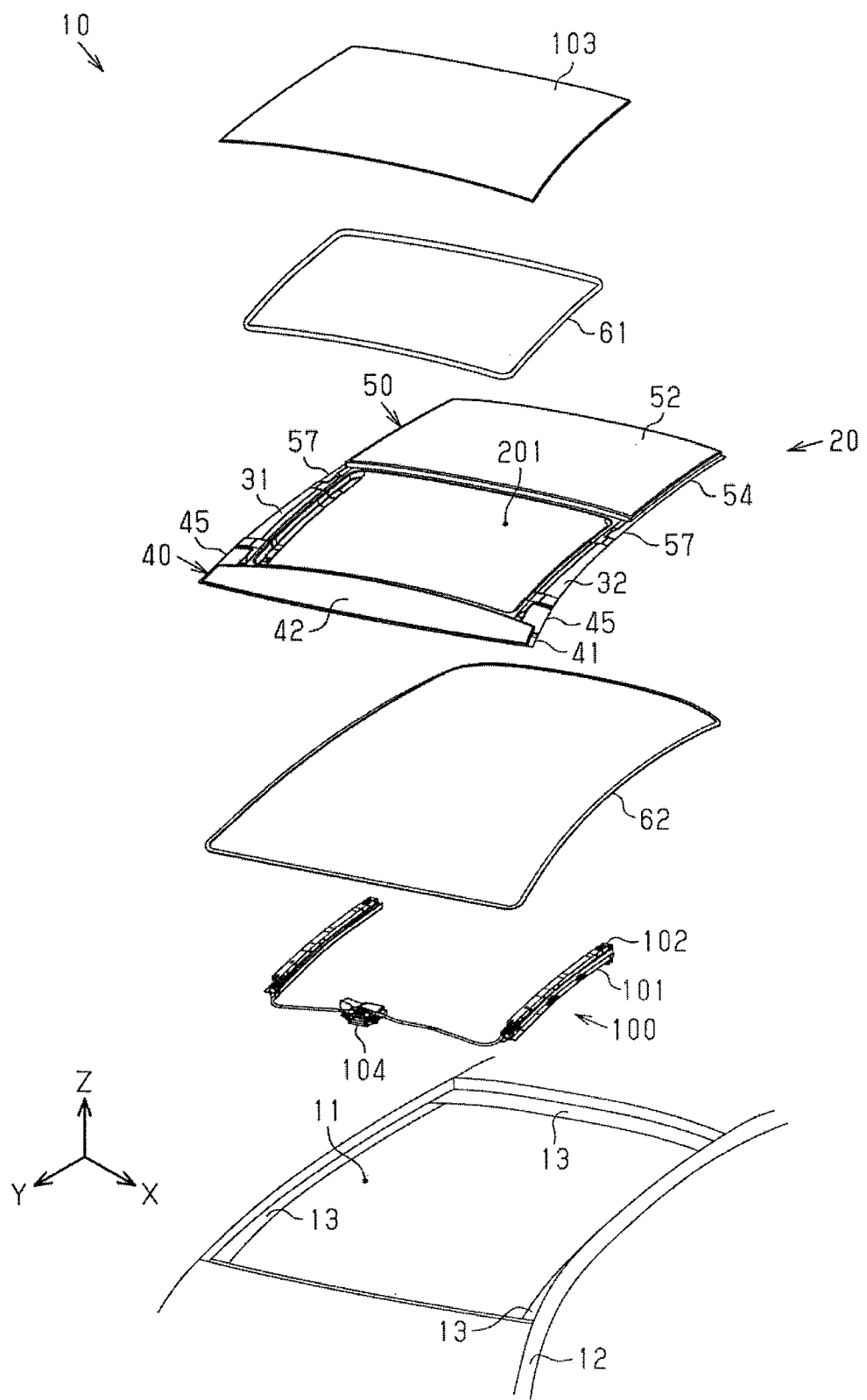
FIG. 1 is an exploded perspective view of a sunroof device and a sunroof panel according to an embodiment disclosed here.

As illustrated in FIG. 1, a vehicle 10 includes a body 12, a sunroof panel 20, and a sunroof apparatus 100. The body 12 includes an opening portion 11 which is formed in a substantially quadrilateral shape. The sunroof panel 20 is mounted on the opening portion 11. The sunroof apparatus 100 is mounted on the sunroof panel 20. Hereinafter, in the figures, the vehicle width direction is illustrated as a direction in which an X shaft extends, the vehicle front-rear direction is illustrated as a direction in which a Y shaft extends, and the vehicle upper-lower direction is illustrated as a direction in which a Z shaft extends.

The body 12 includes a mounted part 13 on which the sunroof panel 20 is mounted. The mounted part 13 is formed in a frame shape in a plan view, and is provided along a peripheral rim of the opening portion 11. The sunroof panel 20 includes a first side frame 31, a second side frame 32, a front structural body 40, and a rear structural body 50. The first side frame 31 and the second side frame 32 is each included in a side portion of the sunroof panel 20 in the vehicle width direction. The front structural body 40 is included in a front part of the sunroof panel 20. The rear structural body 50 is included in a rear part of the sunroof panel 20. The sunroof panel 20 includes a weatherstrip 61 and a seal 62 both preventing, for example, water from entering inside a vehicle compartment. The sunroof panel 20 of the embodiment corresponds to a separated-type sunroof panel in which separately-formed frames are connected with one another.

As illustrated in FIG. 1, the first side frame 31 and the second side frame 32 extend in the vehicle front-rear direction at opposing ends of the vehicle in the vehicle width direction, and each includes a symmetric shape in the width direction. Hereinafter, the first side frame 31 will be mainly explained.

Figure 2:
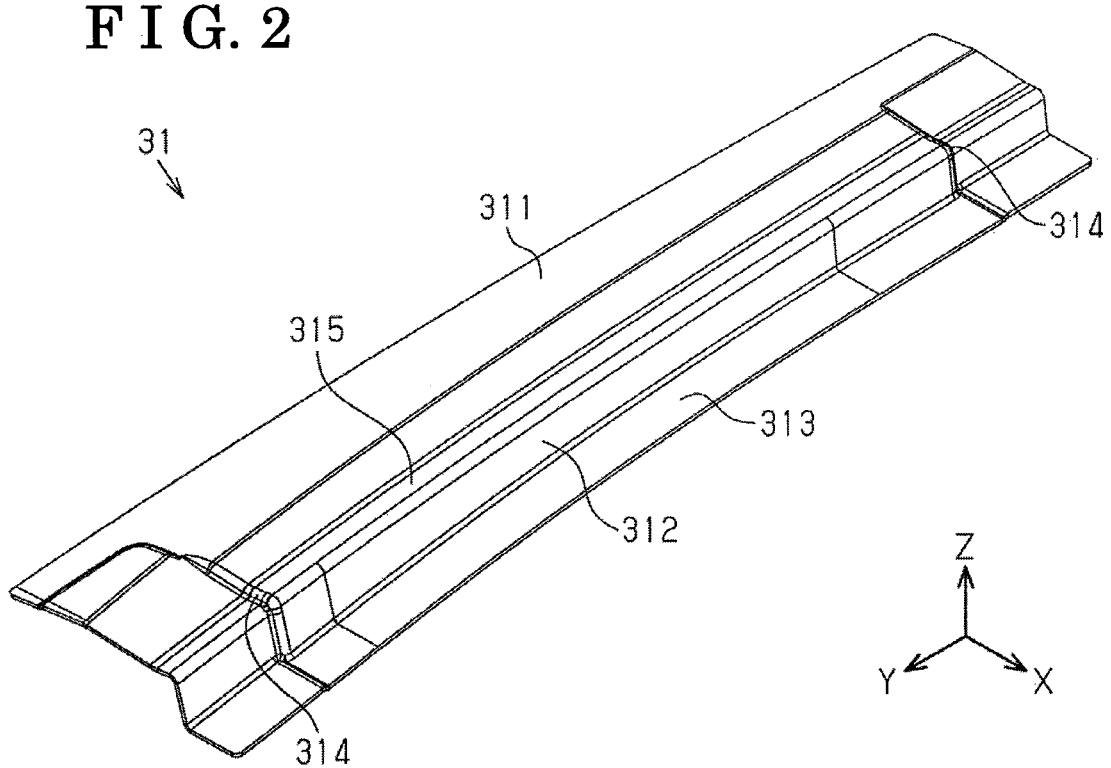
FIG. 2 is a perspective view of a first side frame of the sunroof panel when seen from above.
Figure 3:
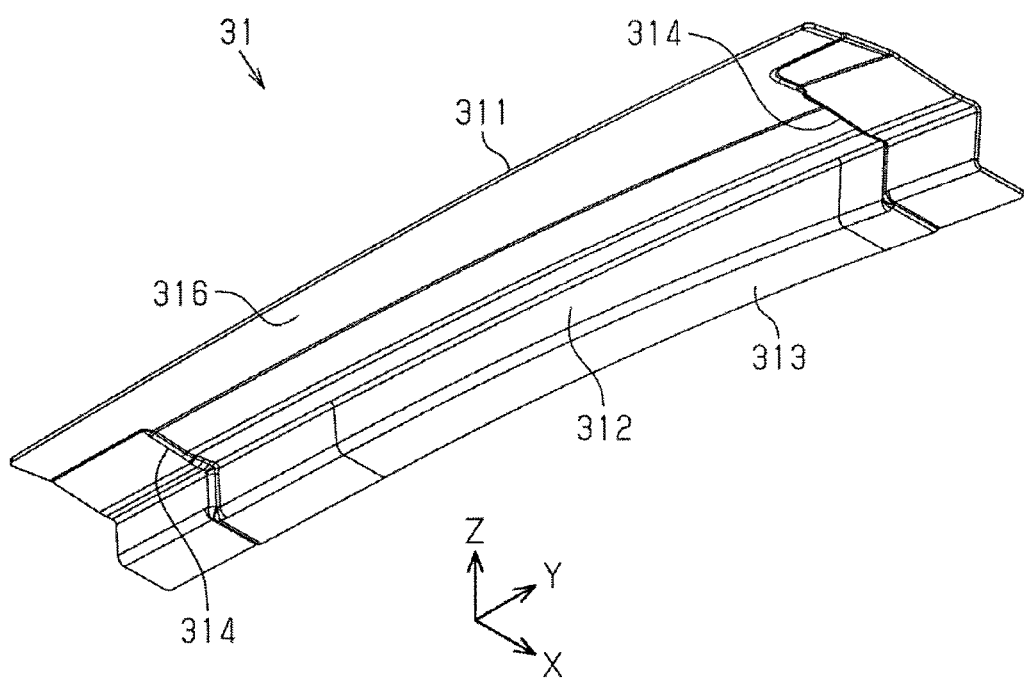
FIG. 3 is a perspective view of the first side frame of the sunroof panel when seen from below.

As shown in FIGS. 2 and 3, the first side frame 31 includes a cross section in a longitudinal direction, the cross section which is formed in a substantially same shape. The first side frame 31 is, for example, made from a pressed metal plate. The first side frame 31 includes a first wall portion 311, a second wall portion 312, and a third wall portion 313. The first wall portion 311 extends in the vehicle width direction. The second wall portion 312 extends downwardly of the vehicle 10 from an inner rim of the first wall portion 311. The third wall portion 313 extends inwardly of the vehicle from a lower end of the second wall portion 312. The second wall portion 312 includes steps 314 which displace the front end and the rear end of the second wall portion 312 downwardly from a center portion thereof. As illustrated in FIG. 2, an upper surface of the first wall portion 311 includes a first attachment surface 315 to which the weatherstrip 61 is attached over the longitudinal direction. As illustrated in FIG. 3, a lower surface of the first wall portion 311 includes a second attachment surface 316 attached to the body 12 via the seal 62 over the longitudinal direction.

Figure 4:
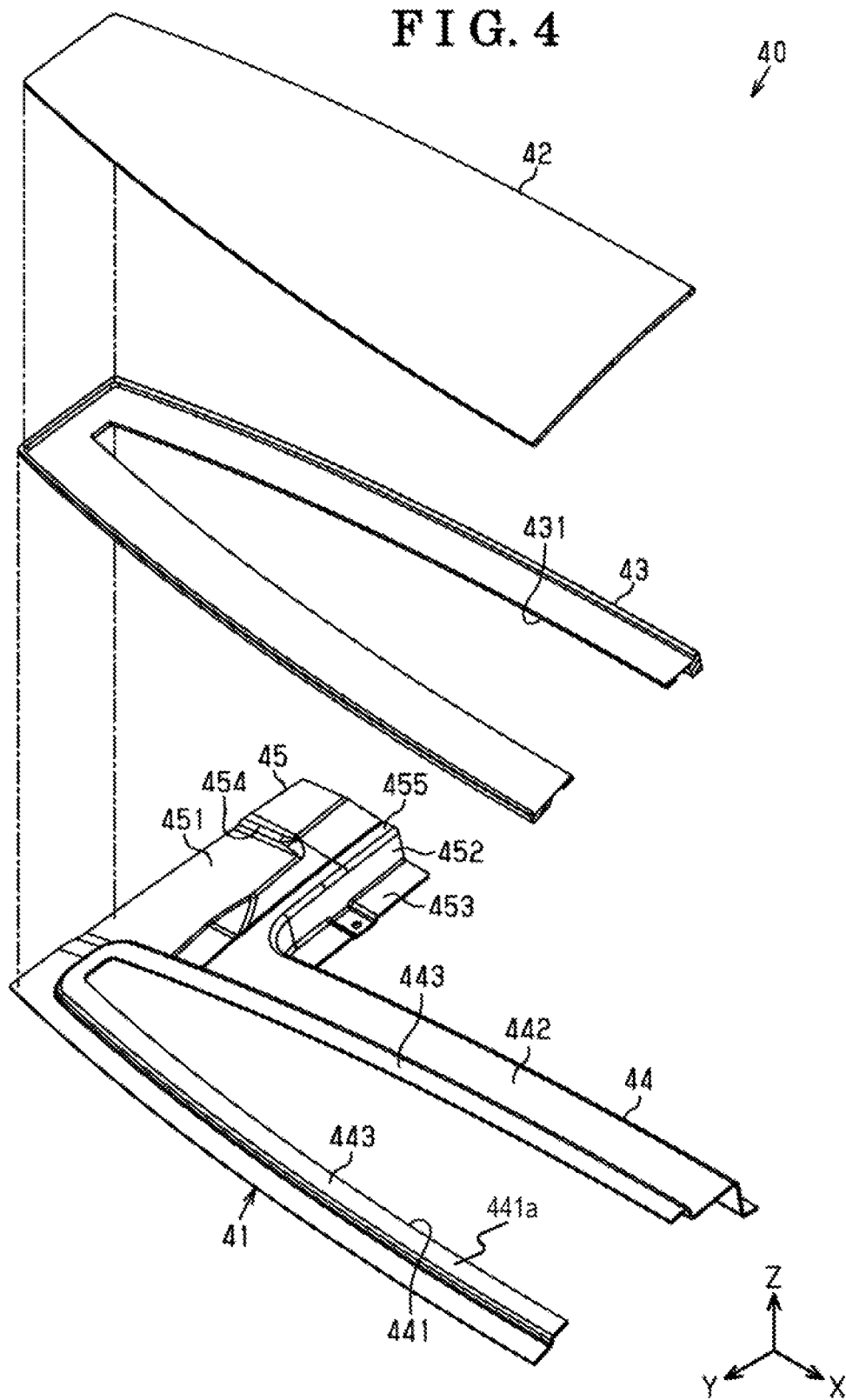
FIG. 4 is an exploded perspective view of a front structural body when seen from above.

As illustrated in FIGS. 1 and 4, the front structural body 40 includes a front frame unit 41, a front panel 42, and a front joint layer 43. The front frame unit 41 connects a front end portion of the first side frame 31 and a front end portion of the second side frame 32 with each other. The front panel 42 covers most parts of the front frame unit 41 from upward of the vehicle. The front joint layer 43 joints the front frame unit 41 and the front panel 42 with each other.

As illustrated in FIGS. 1 and 4, the front frame unit 41 includes a front frame 44 and first connection frames 45. The front frame 44 extends in the vehicle width direction. The first connection frames 45 extend rearwardly of the vehicle from a first end portion and a second end portion of the front frame 44, respectively, the first end portion and the second end portion which are disposed at opposing end portions of the front frame 44 in the vehicle width direction. The front frame 44 and the first connection frames 45 are integrally formed by pressing a metal plate.

Figure 5:
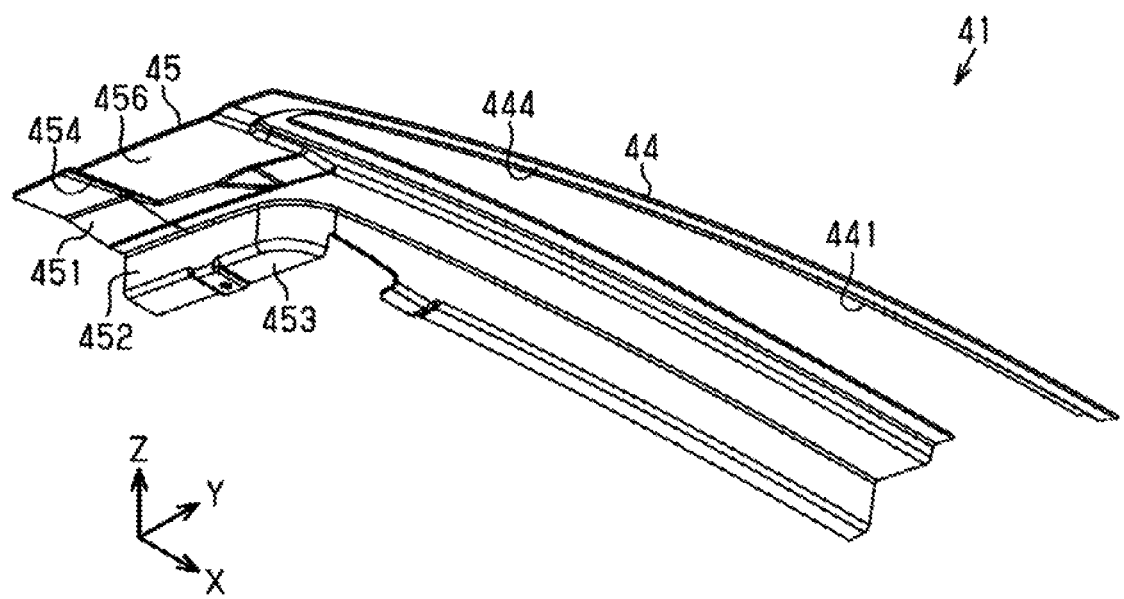
FIG. 5 is a perspective view of a front frame unit when seen from below.

As illustrated in FIGS. 4 and 5, the front frame 44 is formed in a substantially quadrilateral plate shape which includes the vehicle front-rear direction as a lateral direction and the vehicle width direction as a longitudinal direction. The front frame 44, when seen from the front of the vehicle, includes a curved shape having a center portion in the vehicle width direction, the center portion which is disposed upwardly relative to opposing end portions of the front frame 44. The front frame 44 further includes a frame-rim 441a having an edge defining a first opening portion 441 over the vehicle width direction for letting light in a vehicle compartment.

As shown in FIG. 4, a first attaching surface 442 to which the weatherstrip 61 is attached is provided at an upper surface rear portion of the front frame 44 over the vehicle width direction. An attachment surface 443 which is attached to the front panel 42 is provided at the frame-rim 441a of the front frame 44. As shown in FIG. 5, a second attachment surface 444 is provided along an outer rim of a bottom surface of the front frame 44, the second attachment surface 444 attached to the body 12 via the seal 62.

As shown in FIGS. 4 and 5, the first connection frame 45 includes a cross sectional shape which is similar to that of the front end portion of the first side frame 31. The first connection frame 45 includes a first wall portion 451, a second wall portion 452, and a third wall portion 453 when seen in a cross sectional view which is orthogonal to the longitudinal direction. In the cross sectional view which is orthogonal to the longitudinal direction, the first wall portion 451 extends in the vehicle width direction, the second wall portion 452 extends downwardly of the vehicle from an inner rim of the first wall portion 451, and the third wall portion 453 extends inwardly of the vehicle from a lower rim of the second wall portion 452. The first wall portion 451 is provided with a step 454 so as to be disposed to displace the rear end portion thereof upwardly of the vehicle relative to the base end portion thereof. As such, rear end portions of the first connection frames 45 correspond to parts overlapping a front end portion of the first side frame 31 and a front end portion of the second side frame 32, respectively, from upward of the vehicle. As illustrated in FIG. 4, a first attachment surface 455 on which the weatherstrip 61 is attached is provided over extending direction of the first connection frame 45. As illustrated in FIG. 5, a second attachment surface 456 attached to the body 12 via the seal 62 is provided over the extending direction of the first connection frame 45 at a bottom surface of the first wall portion 451.

In the embodiment, the front frame 44 corresponds to an example of a main frame including an opening portion over the vehicle width direction. The first connection frame 45 corresponds to an example of a first sub frame and a second sub frame. Specifically, in FIG. 1, the first connection frame 45 connected to the first side frame 31 corresponds to an example of the first sub frame. The first connection frame 45 connected to the second side sub frame 32 corresponds to an example of a second frame.

As shown in FIG. 4, the front panel 42 includes a substantially-quadrilateral plate shape smaller than the front frame 44 and larger than the first opening portion 441 of the front frame 44 when seen in a plan view. The front panel 42 only needs to be a panel, for example, a glass panel that penetrates light. The front panel 42 is an example of a fixed panel which closes the first opening portion 441.

Figure 6:
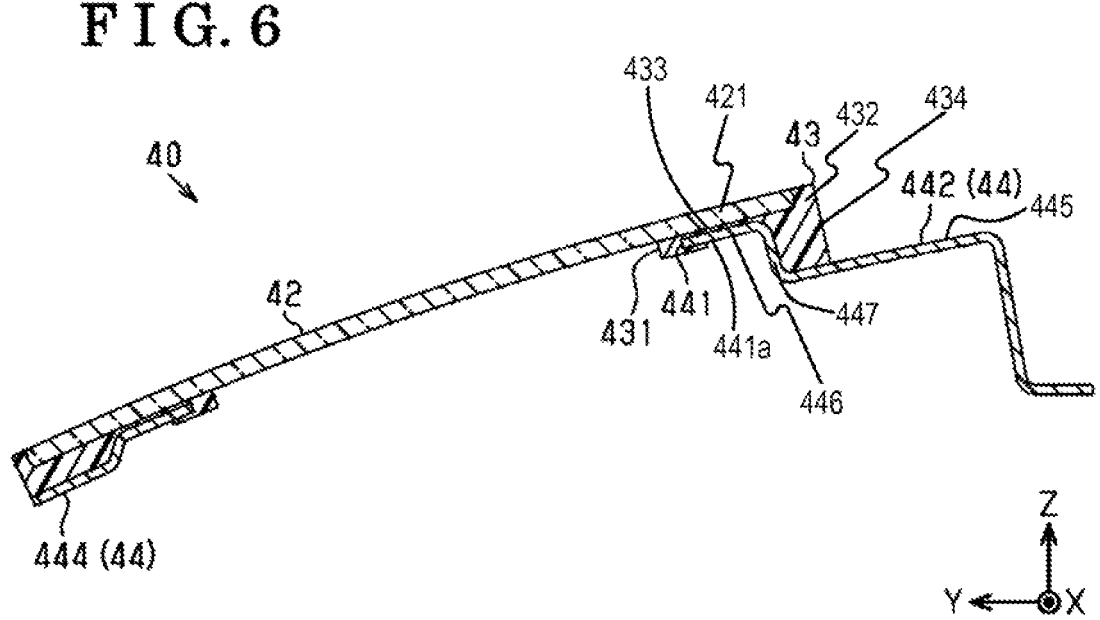
FIG. 6 is a cross-sectional view of the front structural body in a width direction.

As illustrated in FIG. 4, the front joint layer 43 is formed in a plate shape which corresponds to or supports the front frame 44 and front panel 42. The front joint layer 43 includes a first opening portion 431 which is similar to the first opening portion 441 of the front frame 44. As shown in FIG. 6, the front joint layer 43 corresponds to a part where the front frame 44 and the front panel 42 are joined with each other, and covers a panel-rim 421 of the front panel 42. As also shown in FIG. 6, the front joint layer 43 covers the edge of the frame-rim 441a and sandwiches the frame-rim 441a. The front frame 44 includes a lower portion 445, an upper portion 446 (which includes the frame-rim 441a), and an intermediate portion 447 extending from the lower portion 445 to the upper portion 446. The front joint layer 43 includes an upper lip portion 432 contacting an outer edge of the panel rim 421, a joining portion 433 disposed in-between the upper portion 446 and the front panel 42, and a lower lip portion 434 contacting the intermediate portion 447 and the lower portion 445. The front joint layer 43 is made of liquid resin which is injected in a mold in which the front frame unit 41 and the front panel 42 are disposed and which is hardened in the mold. A normal injection molding method may be employed for the molding method of the front joint layer 43, however, it is preferable that a Reaction Injection Molding method or a RIM method is employed when considering a liquidity of the liquid resin within the mold.

Figure 7:
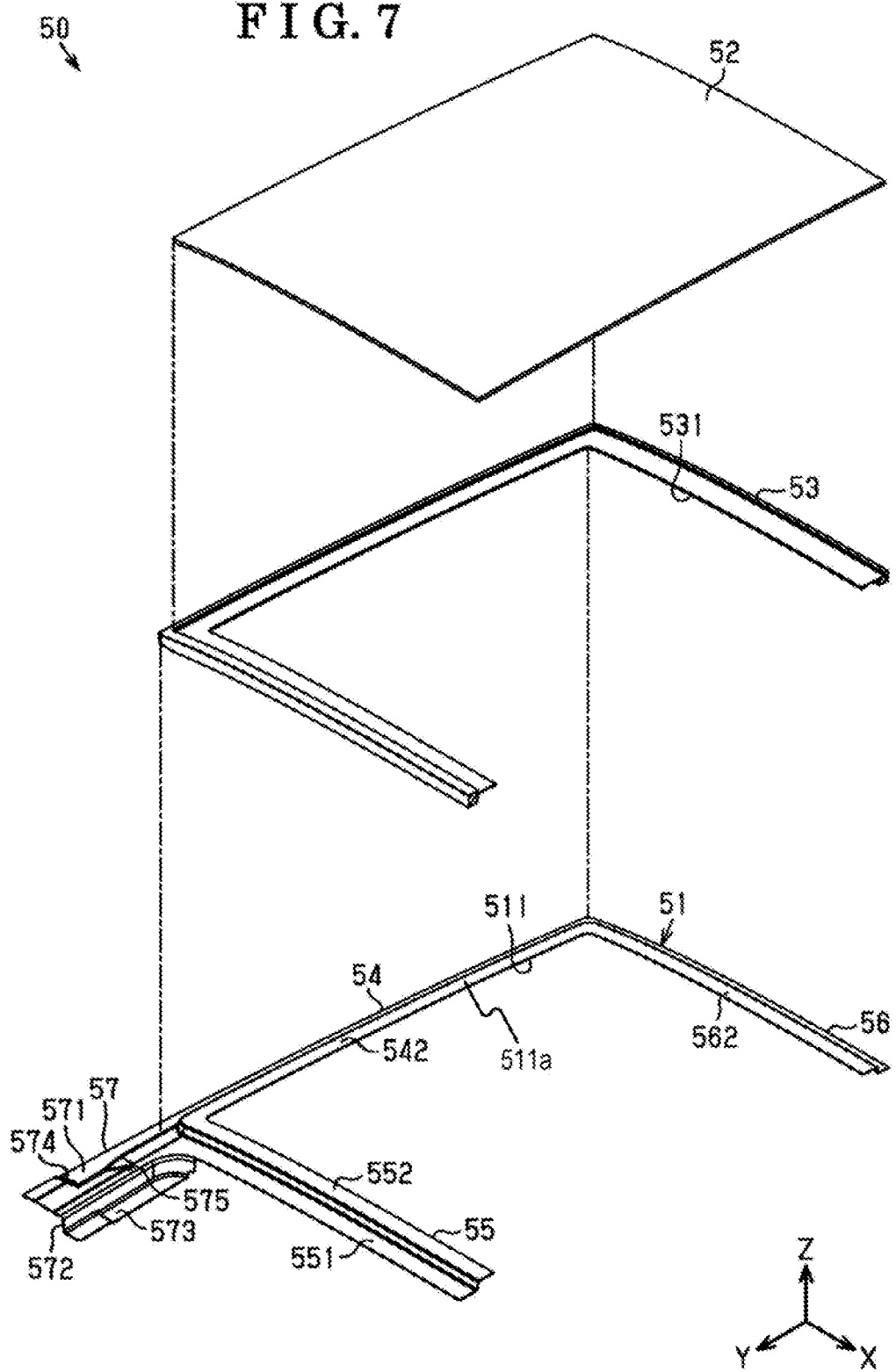
FIG. 7 is an exploded perspective view of a rear structural body when seen from above.

As such, the front structural body 40 of the embodiment is attached with the front panel 42 before being connected to the first side frame 31 and the second side frame 32. As illustrated in FIGS. 1 and 7, the rear structural body 50 includes a rear frame unit 51, a rear panel 52, and a rear joint layer 53. The rear frame unit 51 connects a rear end portion of the first side frame 31 and a rear end portion of the second side frame 32. The rear panel 52 covers, from upward of the vehicle, a third opening portion 511 which is defined by an edge of a frame-rim 511a of the rear frame unit 51. The rear joint layer 53 joints the rear frame unit 51 and the rear panel 52 with each other.

As shown in FIG. 7, the rear frame unit 51 includes rear side frames 54, a center frame 55, and a rear frame 56. The rear side frames 54 extend in the vehicle front-rear direction at opposing ends of the rear frame unit 51 in the vehicle width direction. The center frame 55 connects front end portions of the rear side frames 54 with each other. The rear frame 56 connects rear end portions of the rear side frames 54 with each other. The rear frame unit 51 includes a second connection frame 57 extending frontward of the vehicle from a first end portion and a second end portion of the center frame 55 in the vehicle width direction. The rear frame unit 51 is integrally formed by the press processing of a metal plate. The third opening portion 511 of the rear frame unit 51 is defined by the rear side frames 54, the center frame 55, and the rear frame 56. The third opening portion 511 is formed in a substantially quadrilateral shape having the longitudinal direction as the vehicle width direction and the lateral direction as the vehicle front-rear direction. The third opening portion 511 is formed so as to let light in the vehicle compartment.

Figure 8:
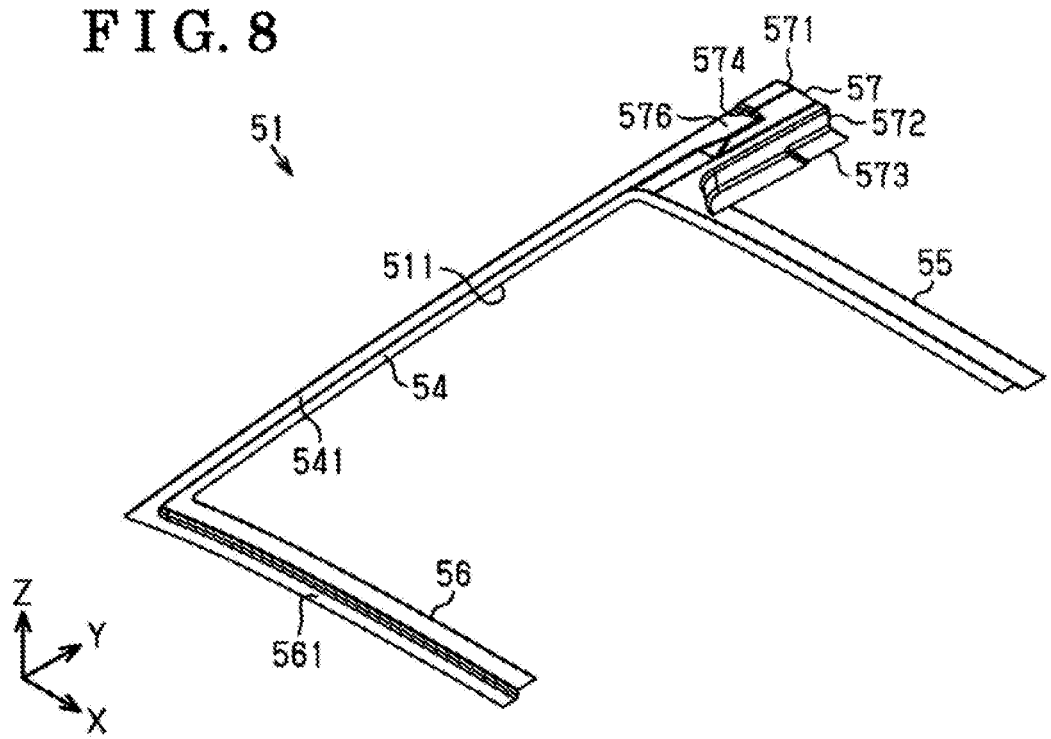
FIG. 8 is a perspective view of a rear frame unit when seen from below.

As shown in FIGS. 7 and 8, the rear side frame 54 extends in the vehicle front-rear direction, the center frame 55 extends in the vehicle width direction, and the rear frame 56 extends in the vehicle width direction. As shown in FIG. 7, a first attachment surface 551 to which the weatherstrip 61 is attached is provided at an upper surface of the center frame 55 over the longitudinal direction thereof. As shown in FIG. 8, second attachment surfaces 541, 561 are provided over the longitudinal direction, the second attachment surfaces 541, 451 to which the body 12 is attached via the seal 62 at the bottom surface of the rear side frame 54 and the bottom surface of the rear frame 56, respectively. As shown in FIG. 7, the upper surface of the rear side frame 54, the upper surface of the center frame 55, and the upper surface of the rear frame 56 are provided with attachment surfaces 542, 552, 562, respectively, which are attached to the rear panel 52, along the third opening portion 511. The second attachment surfaces 541, 561 of the rear side frame 54 and the rear frame 56, respectively, are continuously provided so as not to include a step with each other. The attachment surfaces 542, 552, 562 of the rear side frame 54, the center frame 55, and the rear frame 56, respectively, are continuously provided so as not to include a step with one another.

As shown in FIGS. 7 and 8, the second connection frame 57 includes a cross section which is similar to that of a rear end portion of the first side frame 31. The second connection frame 57 includes a first wall portion 571 and a second wall portion 572, and a third wall portion 573. The first wall portion 571 extends in the vehicle width direction when seen in the cross-sectional view which is orthogonal to the longitudinal direction. In the cross-sectional view which is orthogonal to the longitudinal direction, the second wall portion 572 extends downwardly of the vehicle 10 from the inner end of the first wall portion 571, and the third wall portion 573 extends inwardly of the vehicle 10 from the lower end of the second wall portion 572. As shown in FIG. 7, the first wall portion 571 includes a step 574 so as to be disposed to displace a front end portion thereof upwardly of the vehicle 10 relative to a base portion thereof. As such, a front end portion of the second connection frame 57 corresponds to a part which overlaps the rear end portion of the first side frame 31 and the rear end portion of the second side frame 32 from upward of the vehicle 10. As illustrated in FIG. 7, a first attachment surface 575 on which the weatherstrip 61 is attached is provided at the upper surface of the first wall portion 571 over the extending direction of the first attachment surface 575. As shown in FIG. 8, a second attachment surface 576 is provided at the lower surface of the first wall portion 571 over the extending direction of the second attachment surface 576 which is attached to the body 12 via the seal 62.

According to the embodiment, the rear side frames 54, the center frame 55, and the rear frame 56 correspond to an example of a main frame at which an opening portion is provided over the vehicle width direction. The second connection frames 57 correspond to an example of the first sub frame and the second sub frame. Specifically, in FIG. 1, the second connection frame 57 connected to the first side frame 31 corresponds to an example of the first sub frame, and the second connection frame 57 connected to the second side frame 32 corresponds to an example of the second sub frame.

As shown in FIG. 7, the rear panel 52 is larger than the third opening portion 511 in a plan view. The rear panel 52 may only need to be a panel for example, a glass panel, letting light in, similar to the front panel 42. The rear panel 52 corresponds to an example of a fixed panel configured to close the third opening portion 511.

Figure 9:
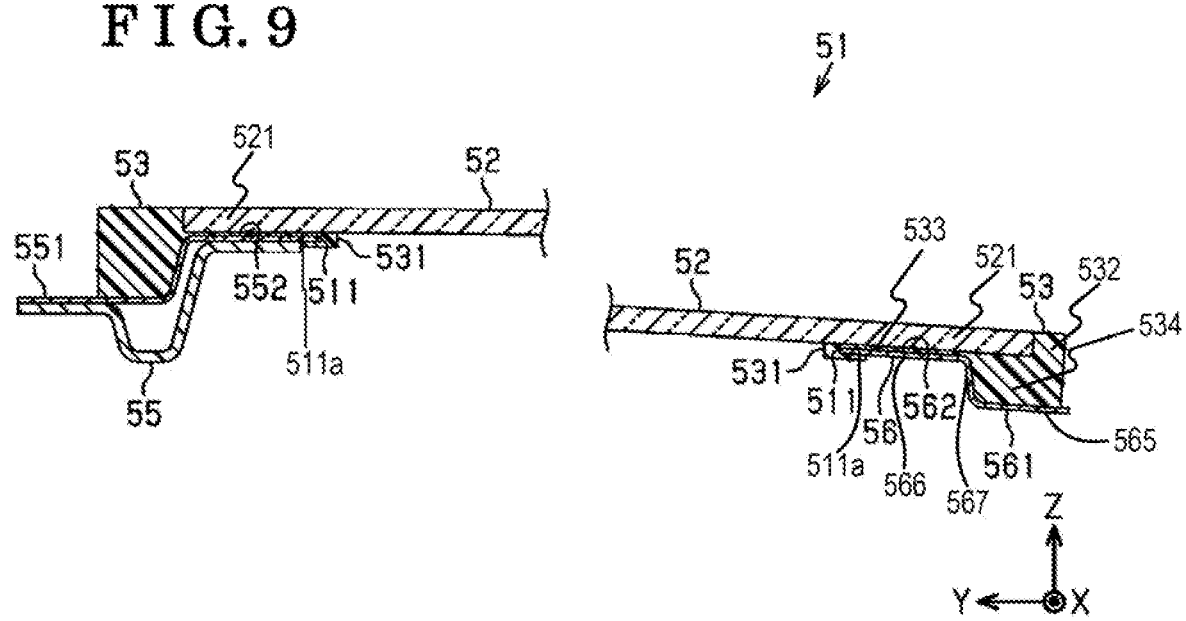
FIG. 9 is a cross-sectional view of the rear structural body in the width direction.

As shown in FIG. 7, the rear joint layer 53 is formed in a frame shape corresponding to or supporting the outer shape of the rear panel 52. The rear joint layer 53 is provided with a third opening portion 531 which is similar to the third opening portion 511 of the rear portion 51. As shown in FIG. 9, the rear joint layer 53 corresponds to a part joining the rear frame unit 51 and the rear panel 52 with each other, and covering a panel-rim 521 of the rear panel 52. As also shown in FIG. 9, the rear joint layer 53 covers the edge of the frame-rim 511a and sandwiches the frame-rim 511a. The rear frame 56 includes a lower portion 565, an upper portion 566 (which includes the frame-rim 511a), and an intermediate portion 567 extending from the lower portion 565 to the upper portion 566. The rear joint layer 53 includes an upper lip portion 532 contacting an outer edge of the panel rim 521, a joining portion 533 disposed in-between the upper portion 566 and the rear panel 52, and a lower lip portion 534 contacting the intermediate portion 567 and the lower portion 565. The rear joint layer 53 is, similar to the front joint layer 43, made of liquid resin which is injected in a mold in which the rear frame unit 51 and the rear panel 52 are disposed and which is hardened in the mold. It is favorable that the RIM method is employed for the molding method of the rear joint layer 53.

Here, the rear structural body 50 of the embodiment is joined with the rear panel 52 before being connected to the first side frame 31 and the second side frame 32. As illustrated in FIG. 1, the sunroof apparatus 100 includes guide rails 101, panel brackets 102, a center panel 103, and an actuator 104. The guide rails 101 extend in the vehicle front-rear direction at opposing ends of the sunroof apparatus 100 in the vehicle width direction. The panel brackets 102 are displaced relative to the guide rails 101, respectively. The center panel 103 is supported by the panel brackets 102. The actuator 104 drives the panel brackets 102. The guide rails 101 are fixed by the first side frame 31 and the second side frame 32 of the sunroof panel 20, respectively. The panel brackets 102 each includes a rear end portion which is displaced upward and downward in the vehicle upper-lower direction relative to a front end portion thereof. The rear end portions of the panel brackets 102 are displaced in the vehicle front-rear direction in a state of being disposed upwardly relative to the front end portions thereof. The center panel 103 is open and closed between the fully-closed position where a second opening portion 201 is fully closed, and the fully-open position where the second opening portion 201 is fully open, in accordance with the operation of the panel brackets 102.

The weatherstrip 61 is attached on the sunroof panel 20 so as to surround the second opening portion 201 of the sunroof panel 20. The weatherstrip 61 is compressively deformed between the sunroof panel 20 and the center panel 103 which is disposed at the fully-closed position.

The seal 62 is formed in a frame shape including a size which is substantially the same or similar to the outer shape of the sunroof panel 20. The seal 62 is made from a resin material and a rubber material including water resistant characteristics. The seal 62 is disposed between the sunroof panel 20 and the mounted part 13 of the body 12 so as to fill a gap or a clearance therebetween.

Hereinafter, a manufacturing method of the sunroof panel 20 will be explained.

When the sunroof panel 20 is manufactured, the first side frame 31, the second side frame 32, the front frame unit 41, and the rear frame unit 51 are separately formed. For example, the first side frame 31, the second side frame 32, the front frame unit 41, and the rear frame unit 51 are separately formed by pressing metal plates.

Next, as a joint process, the front joint layer 43 is formed between the front frame unit 41 and the front panel 42 by the RIM method, and the rear joint layer 53 is formed between the rear frame unit 51 and the rear panel 52. That is, in the joint process, the front frame unit 41 and the front panel 42 are joined with each other by the front joint layer 43, and the panel-rim 421 of the front panel 42 is covered by the front joint layer 43. The rear frame unit 51 and the rear panel 52 are joined with each other by the rear joint layer 53, and the panel-rim 521 of the rear panel 52 is covered by the rear joint layer 53. As such, the front structural body 40 and the rear structural body 50 are formed in the joint process.

In the connection process, the first side frame 31, the second side frame 32, and the front frame unit 41 are connected with one another in the front-rear direction in a state where the front end portion of the first side frame 31, the front end portion of the second side frame 32, and the rear end portions of the first connection frames 45 of the front frame unit 41 are overlapped with one another. In the connection process, the first side frame 31, the second side frame 32, and the rear frame unit 51 are connected with one another in the front-rear direction in a state where the rear end portion of the first side frame 31, the rear end portion of the side frame 32, and the front end portions of the second connection frames 57 of the rear frame unit 51 are overlapped with one another.

Here, a mechanical fixing method using, for example, a bolt or a rivet, a welding method, or any other method may be employed for the connection method of the first side frame 31, the second side frame 32, and the front frame unit 41. This can be said to the connection method of the first side frame 31, the second side frame 32, and the rear frame unit 51.

Figure 10:
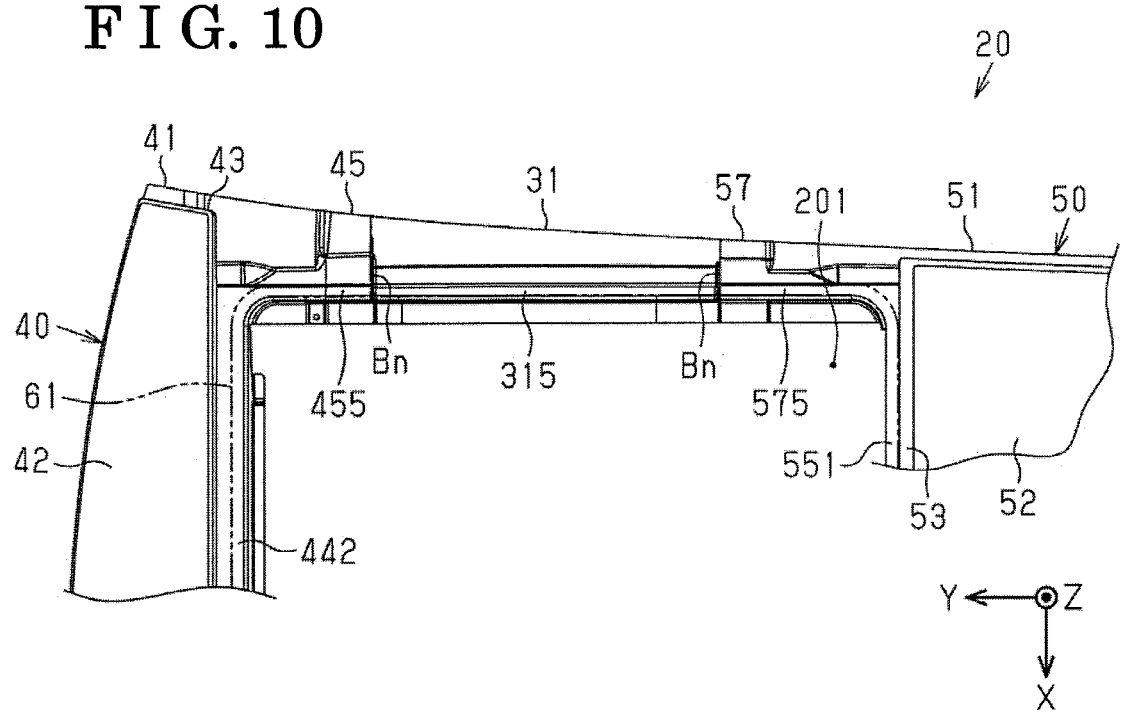
FIG. 10 is a partial plan view of the sunroof panel when seen from above.
Figure 11:
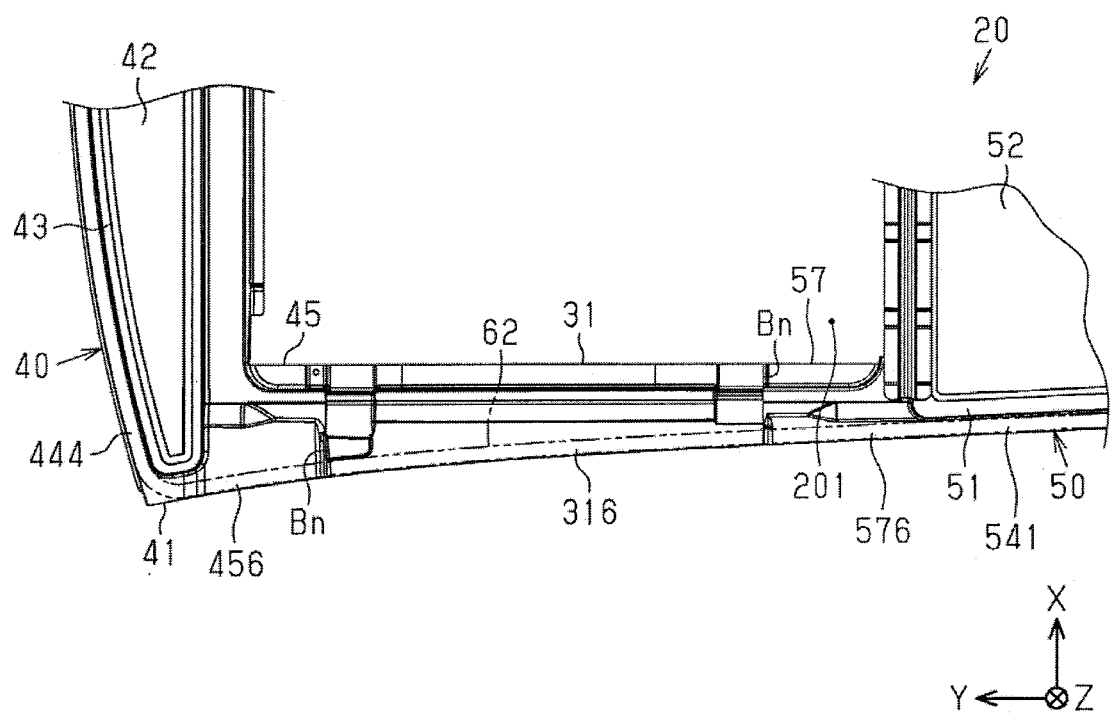
FIG. 11 is a partial bottom view of the sunroof panel when seen from below.

As shown in FIGS. 10 and 11, the first side frame 31, the second side frame 32, the front frame unit 41, and the rear frame unit 51 are connected with one another to define a second opening portion 201.

As shown in FIG. 10, the weatherstrip 61 is attached to the sunroof panel 20 so as to surround the second opening portion 201. In particular, the weatherstrip 61 is attached to the first attachment surfaces 315, 442, 455, 551, 575 of the first side frame 31, the second side frame 32, the front frame unit 41, and the rear frame unit 51, respectively.

As shown in FIG. 11, the seal 62 is attached to the sunroof panel 20 so as to be along the outer rim of the sunroof panel 30 to fill in a gap or a clearance between the sunroof panel 20 and the body 12. In particular, the seal 62 is attached to the second attachment surfaces 316, 444, 456, 541, 561, 576 of the first side frame 31, the second side frame 32, the front frame unit 41, and the rear frame unit 51, respectively.

According to the embodiment, following effects and advantages may be attained.

(1) According to the con the sunroof panel 20, the front joint layer 43 attaching the front panel 42 to the front frame 44 covers the panel-rim 421 of the front panel 42. Thus, the sunroof panel 20 does not have to include the part covering the panel rim 421 of the front panel 42 and the part attaching the front panel 42 to the front frame 44 individually. Similarly, according to the configuration of the sunroof panel 20, the rear joint layer 53 attaching the rear panel 52 to the rear frame unit 51 covers the panel rim 521 of the rear panel 52. Thus, the sunroof panel 20 does not have to include the part covering the panel rim 521 of the rear panel 52 and the part attaching the rear panel 52 to the rear frame unit 51 individually.

Furthermore, the sunroof panel 20 of the embodiment corresponds to a divided-type sunroof panel. Thus, according to the configuration of the sunroof panel 20 of the embodiment, when comparing to an integral sunroof panel having the side frames 31, 32 and the frame units (the front frame unit 41, the rear frame unit 51) being integrally formed, the front panel 42 and the rear panel 52 may be attached to the frame units (the front frame unit 41, the rear frame unit 51), respectively, before being connected to the side frames 31, 32, respectively. In other words, the mountability of the front panel 42 and the rear panel 52 is enhanced. As such, according to the configuration of the sunroof panel 20 of the embodiment, the front panel 42 and the rear panel 52 may be easily attached to the vehicle 10.

(2) The front frame unit of the Patent reference 1 including the attachment surface bridging over the plural frames which are connected with one another, the attachment surface attaching the front frame unit to the fixed panel, may not be correctly joined or attached with the front panel 42 if gaps between the plural frames connected with one another are not filled. On the contrary, according to the aforementioned embodiment, each of the frame units (the front frame unit 41, the rear frame unit 51) corresponds to a single frame.

Accordingly, the sealing characteristics of the attachment surfaces 443, 542, 552, 562 do not have to be considered when attaching the front panel 42 and the rear panel 52 to the frame units (the front frame unit 41, the rear frame unit 51), respectively.

Specifically, as shown in FIGS. 10 and 11, the sunroof panel 20 of the embodiment includes a connection part of the frame at the part extending in the vehicle front-rear direction. Accordingly, the front joint layer 43 does not bridge a border Bn where the first side frame 31 and the second side frame 32 are connected to the front frame unit 41 although the weatherstrip 61 and the seal 62 bridge the border Bn. On the other hand, according to the sunroof panel disclosed in Patent reference 1, the sunroof panel including the connection part of the frame at the extending part of the front frame unit 41 in the vehicle width direction, the front joint layer 43 in addition to the weatherstrip 61 and the seal 62 bridges a border where the frames are connected with one another. Thus, in this case, according to the sunroof panel 20 of the embodiment, comparing to the sunroof panel of the Patent reference 1, the sealing characteristics of the attachment surfaces 443, 542, 562 do not have to be considered when the front panel 42 and the rear panel 52 are attached to the frame units 41, 51, respectively.

(3) The side frames 31, 32 are connected to the first connection frame 45 and the second connection frame 57 of the frame units (the front frame unit 41, the rear frame unit 51) in a state of including respective overlapped parts in the vehicle front-rear direction. Thus, according to the sunroof panel 20, the overlapping amount of the side frames 31, 32 and the first connection frame 45 in the vehicle front-rear direction may be easily changed, and the overlapping amount of the side frames 31, 32 and the second connection frame 57 in the vehicle front-rear direction may be easily changed. That is, the length of the sunroof panel 20 of the embodiment may be changed in the vehicle front-rear direction in a case where one of the side frames 31, 32, the front frame unit 41 and the rear frame unit 51 changes the design thereof. In other words, the length of the sunroof panel 20 of the embodiment in the vehicle front-rear direction may be easily changed in accordance with the type of the vehicle.

This disclosure may be modified as follows.

The sunroof panel 20 may include only one of fixed panels which are the front panel 42 and the rear panel 52. In this case, the sunroof panel 20 does not have to include the other fixed panel.

Shapes of the side frames 31, 32 and the frame units (the front frame unit 41, the rear frame unit 51) included in the sunroof panel 20 may be appropriately changed in accordance with the size of the vehicle 10 to which the sunroof panel 20 is attached.

The front panel 42, the center panel 103, and the rear panel 52 do not have to be made of glass. The panels have only to be made from a material including transparency and being required to cover the rim of the panels.

The sunroof panel 20 does not have to include the second opening portion 201 opened and closed by the center panel 103. That is, the sunroof panel 20 may be applied to a vehicle including only a fixed panel without having a movable panel.

The front joint layer 43 may be formed to cover the lower surface of the front frame 44 of the front frame unit 41. In this case, the front joint layer 43 may correspond to an attachment surface in which the front frame 44 and the body 12 are attached with each other via the seal 62. According to the configuration, the thickness of the front joint layer 43 is changed without changing the shape of the front frame 44 so that the front frame 44 may be attached to the body 12 of vehicles including the mounted parts 13 having different shapes and configurations. This configuration may also be applied to the rear joint layer 53.

The front joint layer 43 may not only covers the panel-rim 421 of the front panel 42 but also may include the design of the front panel 42. According to the configuration, the front panel 42 does not have to include another design individually or separately. This configuration may also be applied to the rear joint layer 53.

According to the aforementioned embodiment, the sunroof apparatus (100) for the vehicle (10) includes the first side frame (31) disposed at one of opposing ends of the sunroof apparatus (100) in the vehicle width direction, the first side frame (31) extending in the vehicle front-rear direction, the second side frame (32) disposed at the other of opposing ends of the sunroof apparatus (100) in the vehicle width direction, the second side frame (32) extending in the vehicle front-rear direction, the frame unit (the front frame unit 41, the rear frame unit 51) including the main frame (the front frame 44, the rear side frames 54, the center frame 55, and the rear frame 56) including the opening portion (the second opening portion 201, the first opening portion 441, the third opening portion 511) extending in the vehicle width direction, the first sub frame (the first connection frame 45, the second connection frame 57) extending in the vehicle front-rear direction from the first end portion of the main frame (the front frame 44, the rear side frames 54, the center frame 55, and the rear frame 56) in the vehicle width direction, and the second sub frame (the first connection frame 45, the second connection frame 57) extending in the vehicle front-rear direction from the second end portion of the main frame (the front frame 44, the rear side frames 54, the center frame 55, and the rear frame 56) in the vehicle width direction, the frame unit (the front frame unit 41, the rear frame unit 51) connecting the end portion of the first side frame (31) and the end portion of the second side frame (32) in the vehicle width direction, the fixed panel (the front panel 42, the rear panel 52 covering the opening portion (the second opening portion 201, the first opening portion 441, the third opening portion 511) of the main frame (the front frame 44, the rear side frames 54, the center frame 55, and the rear frame 56), and the joint layer (the front joint layer 43, the rear joint layer 53) covering the panel-rim of the fixed panel (the panel-rim 421 of the front panel 42, the panel-rim 521 of the rear panel 52) and joining the main frame (the front frame 44, the rear side frames 54, the center frame 55, and the rear frame 56) and the fixed panel (the front panel 42, the rear panel 52). The first side frame (31) is connected with the first sub frame (the first connection frame 45, the second connection frame 57) in the vehicle front-rear direction, and the second side frame (32) is connected with the second sub frame (the first connection frame 45, the second connection frame 57) in the vehicle front-rear direction.

According to the sunroof panel 100 for the vehicle 10 of the aforementioned configuration, the joint layer (the front joint layer 43, the rear joint layer 53) joining the fixed panel (the front panel 42, the rear panel 52) to the main frame (the front frame 44, the rear side frames 54, the center frame 55, and the rear frame 56) covers the panel-rim of the fixed panel (the panel-rim 421 of the front panel 42, the panel-rim 521 of the rear panel 52). Accordingly, the sunroof panel 100 does not have to be separately provided with the part covering the panel-rim of the fixed panel (the panel-rim 421 of the front panel 42, the panel-rim 521 of the rear panel 52) and the part joining the fixed panel (the front panel 42, the rear panel 52) to the main frame (the front frame 44, the rear side frames 54, the center frame 55, and the rear frame 56). The sunroof panel 100 for the vehicle 10 corresponds to the divided-type sunroof panel in which the frame unit (the front frame unit 41, the rear frame unit 51), the first side frame 31 and the second side frame 32 are connected with one another. Accordingly, when comparing to a sunroof panel for a vehicle having a frame unit, a first side frame and a second side frame that are integrally formed, the sunroof panel 100 for the vehicle 10 of the aforementioned embodiment has better operability when the fixed panel (the front panel 42, the rear panel 52) is mounted on the main frame (the front frame 44, the rear side frames 54, the center frame 55, and the rear frame 56) in terms of joining the fixed panel (the front panel 42, the rear panel 52) to the main frame (the front frame 44, the rear side frames 54, the center frame 55, and the rear frame 56) before the frame unit (the front frame unit 41, the rear frame unit 51) is connected to the first side frame 31 and the second side frame 32. Thus, according to the sunroof panel 100 for the vehicle 10 of the embodiment, the fixed panel (the front panel 42, the rear panel 52) is easily mounted on the main frame (the front frame 44, the rear side frames 54, the center frame 55, and the rear frame 56).

According to the aforementioned embodiment, the manufacturing method of the sunroof apparatus (100) for a vehicle (10), the sunroof apparatus (100) including the first side frame (31) disposed at the one of opposing ends of the sunroof apparatus (100) in the vehicle width direction, the first side frame (31) extending in the vehicle front-rear direction, the second side frame (32) disposed at the other of opposing ends of the sunroof apparatus (100) in the vehicle width direction, the second side frame (32) extending in the vehicle front-rear direction, the frame unit (41, 51) including the main frame (the front frame 44, the rear side frames 54, the center frame 55, and the rear frame 56) including the opening portion (the second opening portion 201, the first opening portion 441, the third opening portion 511) extending in the vehicle width direction, the first sub frame (the first connection frame 45, the second connection frame 57) extending in the vehicle front-rear direction from the first end portion of the main frame (the front frame 44, the rear side frames 54, the center frame 55, and the rear frame 56) in the vehicle width direction, and the second sub frame (the first connection frame 45, the second connection frame 57) extending in the vehicle front-rear direction from the second end portion of the main frame (the front frame 44, the rear side frames 54, the center frame 55, and the rear frame 56) in the vehicle width direction, the frame unit (the front frame unit 41, the rear frame unit 51) connecting the end portion of the first side frame (31) and the end portion of the second side frame (32) in the vehicle width direction, and the fixed panel (the front panel 42, the rear panel 52) covering the opening portion (the second opening portion 201, the first opening portion 441, the third opening portion 511) of the main frame (the front frame 44, the rear side frames 54, the center frame 55, and the rear frame 56), the manufacturing method of the sunroof panel (100) for the vehicle (10) includes steps of forming the first side frame (31), the second side frame (32), and the frame unit (the front frame unit 41, the rear frame unit 51) separately, forming the joint layer (the front joint layer 43, the rear joint layer 53) by hardening liquid resin injected between the frame unit (the front frame unit 41, the rear frame unit 51) and the fixed panel (the front panel 42, the rear panel 52) which are disposed within the mold, the joint layer (the front joint layer 43, the rear joint layer 53) covering the panel-rim of the fixed panel (the panel-rim 421 of the front panel 42, the panel rim 521 of the rear panel 52) and joining the main frame (the front frame 44, the rear side frames 54, the center frame 55, and the rear frame 56) and the fixed panel (the front panel 42, the rear panel 52), connecting the first side frame (31) and the first sub frame (the first connection frame 45, the second connection frame 57) in the vehicle front-rear direction, and connecting the second side frame (32) and the second sub frame (the first connection frame 45, the second connection frame 57) in the vehicle front-rear direction.

According to the manufacturing method of the sunroof panel 100 for the vehicle 10 of the aforementioned configuration, same or similar effects and advantages of the sunroof panel 100 for the vehicle 10 of the aforementioned embodiment may be attained.

According to the sunroof panel 100 for the vehicle 10 and the manufacturing method thereof, the fixed panel (the front panel 42, the rear panel 52) may be easily mounted on the main frame (the front frame 44, the rear side frames 54, the center frame 55, and the rear frame 56). The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus for a vehicle, comprising:
a first side frame disposed at one of opposing ends of the sunroof apparatus in a vehicle width direction, the first side frame extending in a vehicle front-rear direction;
a second side frame disposed at the other of opposing ends of the sunroof apparatus in the vehicle width direction, the second side frame extending in the vehicle front-rear direction;
a frame unit including
a main frame including a frame-rim having an edge defining an opening portion extending in the vehicle width direction;
a first sub frame extending in the vehicle front-rear direction from a first end portion of the main frame in the vehicle width direction; and
a second sub frame extending in the vehicle front-rear direction from a second end portion of the main frame in the vehicle width direction;
the frame unit connecting an end portion of the first side frame and an end portion of the second side frame in the vehicle width direction;
a fixed panel covering the opening portion of the main frame; and
a joint layer covering a panel-rim of the fixed panel and joining the main frame and the fixed panel; wherein
the first side frame is connected with the first sub frame in the vehicle front-rear direction,
the second side frame is connected with the second sub frame in the vehicle front-rear direction, and
the joint layer covers the edge of the frame-rim and sandwiches the frame-rim.

2. A manufacturing method of a sunroof apparatus for a vehicle, the sunroof apparatus comprising:

a first side frame disposed at one of opposing ends of the sunroof apparatus in a vehicle width direction, the first side frame extending in a vehicle front-rear direction;

a second side frame disposed at the other of opposing ends of the sunroof apparatus in the vehicle width direction, the second side frame extending in the vehicle front-rear direction;

a frame unit including
a main frame including a frame-rim having an edge defining an opening portion extending in the vehicle width direction;
a first sub frame extending in the vehicle front-rear direction from a first end portion of the main frame in the vehicle width direction; and
a second sub frame extending in the vehicle front-rear direction from a second end portion of the main frame in the vehicle width direction;

the frame unit connecting an end portion of the first side frame and an end portion of the second side frame in the vehicle width direction; and a fixed panel covering the opening portion of the main frame; wherein the manufacturing method of the sunroof panel for the vehicle including steps of, forming the first side frame, the second side frame, and the frame unit separately, forming a joint layer by hardening liquid resin injected between the frame unit and the fixed panel which are disposed within a mold, the joint layer covering a panel-rim of the fixed panel and joining the main frame and the fixed panel, the joint layer covering the edge of the frame-rim and sandwiching the frame-rim, connecting the first side frame and the first sub frame in the vehicle front-rear direction, and connecting the second side frame and the second sub frame in the vehicle front-rear direction.

3. The sunroof apparatus of claim 1, wherein
the main frame includes
a lower portion,
an upper portion, and
an intermediate portion extending from the lower portion to the upper portion,
the upper portion including the frame-rim having the edge defining the opening portion, and
the joint layer comprises
an upper lip portion contacting an outer edge of the panel-rim of the fixed panel,
a joining portion disposed in-between the upper portion of the main frame and the fixed panel, and
a lower lip portion contacting the intermediate portion and the lower portion of the main frame.

4. The sunroof apparatus of claim 1, wherein the first side frame and the first sub frame overlap one another in the vehicle front-rear direction, and the second side frame and the second sub frame overlap one another in the vehicle front-rear direction.

5. The manufacturing method of claim 2, wherein
the main frame includes
a lower portion,
an upper portion, and
an intermediate portion extending from the lower portion to the upper portion,
the upper portion including the frame-rim having the edge defining the opening portion, and
the joint layer formed in the method comprises
an upper lip portion contacting an outer edge of the panel-rim of the fixed panel,
a joining portion disposed in-between the upper portion of the main frame and the fixed panel, and
a lower lip portion contacting the intermediate portion and the lower portion of the main frame.

6. The manufacturing method of claim 2, wherein the first side frame and the first sub frame overlap one another in the vehicle front-rear direction, and the second side frame and the second sub frame overlap one another in the vehicle front-rear direction.

* * * * *